United States Patent
Zhao et al.

(10) Patent No.: US 12,034,910 B2
(45) Date of Patent: Jul. 9, 2024

(54) IMAGE ENCODING/DECODING METHOD AND APPARATUS FOR SIGNALING HIGH LEVEL INFORMATION FOR TOOL CONTROL BASED ON COLOR REPRESENTATION FORMAT, AND COMPUTER-READABLE RECORDING MEDIUM STORING BITSTREAM

(71) Applicant: LG Electronics Inc., Seoul (KR)

(72) Inventors: Jie Zhao, Seoul (KR); Seung Hwan Kim, Seoul (KR); Hendry Hendry, Seoul (KR)

(73) Assignee: LG ELECTRONICS INC., Seoul (KR)

(*) Notice: Subject to any disclaimer, the term of this patent is extended or adjusted under 35 U.S.C. 154(b) by 428 days.

(21) Appl. No.: 17/352,901

(22) Filed: Jun. 21, 2021

(65) Prior Publication Data

US 2021/0400257 A1 Dec. 23, 2021

Related U.S. Application Data

(60) Provisional application No. 63/041,076, filed on Jun. 18, 2020.

(51) Int. Cl.
*H04N 19/103* (2014.01)
*H04N 19/136* (2014.01)
*H04N 19/186* (2014.01)

(52) U.S. Cl.
CPC ......... *H04N 19/103* (2014.11); *H04N 19/136* (2014.11); *H04N 19/186* (2014.11)

(58) Field of Classification Search
CPC .. H04N 19/103; H04N 19/136; H04N 19/186; H04N 19/70
See application file for complete search history.

(56) References Cited

U.S. PATENT DOCUMENTS

| | | | | |
|---|---|---|---|---|
| 10,116,937 B2* | 10/2018 | Li | | H04N 19/136 |
| 10,171,833 B2* | 1/2019 | Li | | H04N 19/587 |
| 10,182,241 B2* | 1/2019 | Li | | H04N 19/59 |
| 10,687,069 B2* | 6/2020 | Li | | H04N 19/70 |
| 11,671,591 B2* | 6/2023 | Zhang | | H04N 19/182 |
| | | | | 375/240.02 |
| 11,683,522 B2* | 6/2023 | Li | | H04N 19/176 |
| | | | | 375/240 |
| 11,770,498 B2* | 9/2023 | Wang | | H04N 7/01 |
| | | | | 375/240.01 |
| 2020/0267395 A1* | 8/2020 | Li | | H04N 19/126 |
| 2022/0124340 A1* | 4/2022 | Deng | | H04N 19/176 |
| 2023/0137603 A1* | 5/2023 | Zhao | | H04N 19/463 |
| | | | | 375/240.18 |
| 2023/0171404 A1* | 6/2023 | Zhao | | H04N 19/50 |
| | | | | 375/240.03 |

(Continued)

*Primary Examiner* — Bobbak Safaipour
(74) *Attorney, Agent, or Firm* — Bryan Cave Leighton Paisner LLP

(57) ABSTRACT

An image encoding/decoding method and apparatus for signaling an ACT or LMCS tool based on a color space and a method of transmitting a bitstream are provided. An image decoding may include determining a color space of a current image, determining whether to enable a predetermined decoding tool based on the color space, and decoding the current image depending on whether to enable the predetermined decoding tool.

12 Claims, 12 Drawing Sheets

(56) References Cited

U.S. PATENT DOCUMENTS

| | | | |
|---|---|---|---|
| 2023/0188714 A1* | 6/2023 | Hendry | H04N 19/176 |
| | | | 375/240.29 |
| 2023/0199169 A1* | 6/2023 | Ahn | H04N 19/70 |
| | | | 375/240.02 |
| 2023/0199191 A1* | 6/2023 | Hendry | H04N 19/70 |
| | | | 375/240.02 |
| 2023/0262218 A1* | 8/2023 | Zhao | H04N 19/12 |
| | | | 375/240.03 |
| 2023/0291904 A1* | 9/2023 | Esenlik | H04N 19/176 |

* cited by examiner

| seq_parameter_set_rbsp( ) { | Descriptor |
|---|---|
|   sps_decoding_parameter_set_id | u(4) |
|   ... | |
|   sps_chroma_format_idc | u(2) |
|   if( sps_chroma_format_idc == 3 ) | |
|     sps_separate_colour_plane_flag | u(1) |
|   ... | |

| sps_chroma_format_idc | sps_separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

FIG. 10

| Forward Conversion: GBR to YCgCo | Backward Conversion: YCgCo to GBR |
|---|---|
| Co = R-B; | t = Y - (Cg>>1) |
| t = B + (Co>>1); | G = Cg + t |
| Cg = G - t; | B = t - (Co>>1) |
| Y = t + (Cg>>1); | R = Co + B |

FIG. 11

| seq_parameter_set_rbsp( ) { | Descriptor |
|---|---|
|   sps_decoding_parameter_set_id | u(4) |
| ..... | |
|   if( ChromaArrayType == 3 && !sps_max_luma_transform_size_64_flag ) | |
|     sps_act_enabled_flag | u(1) |
|   } | |
| ... | |

FIG. 13

| seq_parameter_set_rbsp( ) { | Descriptor |
|---|---|
| sps_decoding_parameter_set_id | u(4) |
| ... | |
| sps_chroma_format_idc | u(3) |
| ... | |
| sps_lmcs_enabled_flag | u(1) |
| sps_lfnst_enabled_flag | u(1) |
| ... | |

FIG. 14

| sps_chroma_format_idc | Chroma format | SubWidthC | SubHeightC |
|---|---|---|---|
| 0 | Monochrome | 1 | 1 |
| 1 | 4:2:0 | 2 | 2 |
| 2 | 4:2:2 | 2 | 1 |
| 3 | YUV 4:4:4 | 1 | 1 |
| 4 | RGB 4:4:4 | 1 | 1 |
| 5 | Other 4:4:4 | 1 | 1 |

FIG. 15

| seq_parameter_set_rbsp( ) { | Descriptor |
|---|---|
| sps_decoding_parameter_set_id | u(4) |
| ... | |
| sps_chroma_format_idc | u(2) |
| sps_colour_representation_idc | u(2) |
| ... | |
| sps_lmcs_enabled_flag | u(1) |
| sps_lfnst_enabled_flag | u(1) |
| ... | |

| seq_parameter_set_rbsp( ) { | Descriptor |
|---|---|
| sps_decoding_parameter_set_id | u(4) |
| ..... | |
| if(sps_colour_representation_idc == RGB && !sps_max_luma_transform_size_64_flag ) | |
|   sps_act_enabled_flag | u(1) |
| } | |
| ... | |

| seq_parameter_set_rbsp( ) { | Descriptor |
|---|---|
| sps_decoding_parameter_set_id | u(4) |
| ..... | |
| if(sps_colour_representation_idc != RGB ) | |
|   sps_lmcs_enabled_flag | u(1) |
| } | |
| ... | |

IMAGE ENCODING/DECODING METHOD AND APPARATUS FOR SIGNALING HIGH LEVEL INFORMATION FOR TOOL CONTROL BASED ON COLOR REPRESENTATION FORMAT, AND COMPUTER-READABLE RECORDING MEDIUM STORING BITSTREAM

CROSS-REFERENCE TO RELATED APPLICATION

This application claims the benefit of U.S. Provisional Application No. 63/041,076, filed on Jun. 18, 2020, the contents of which are all hereby incorporated by reference herein in their entirety.

FIELD OF THE INVENTION

The present disclosure relates to an image encoding/decoding method and apparatus and, more particularly, to an image encoding/decoding method and apparatus for signaling high level information for adaptive color transform (ACT) tool or luma mapping with chroma scaling (LMCS) tool control based on a color representation format, and a computer-readable recording medium storing bitstream generated by the image encoding/decoding method/apparatus of the present disclosure.

DESCRIPTION OF THE RELATED ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

In addition, an object of the present disclosure is to provide an image encoding/decoding method and apparatus capable of improving encoding/decoding efficiency, by efficiently signaling high level information for adaptive color transform (ACT) tool or luma mapping with chroma scaling (LMCS) tool control.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may include determining a color space of a current image, determining whether to enable a predetermined decoding tool based on the color space, and decoding the current image depending on whether to enable the predetermined decoding tool.

In the image decoding method of the present disclosure, the predetermined decoding tool may include adaptive color transform (ACT) or luma mapping with chroma scaling (LMCS).

In the image decoding method of the present disclosure, the determining the color space of the current image may be performed based on color space information obtained from a bitstream, and the color space information may identify whether the color space of the current image is an RGB color space.

In the image decoding method of the present disclosure, the determining whether to enable the predetermined decoding tool may be performed based on enabling information of the predetermined decoding tool obtained from a bitstream.

In the image decoding method of the present disclosure, the predetermined decoding tool may be ACT and enabling information of the ACT may be obtained from the bitstream based on the color space being an RGB color space.

In the image decoding method of the present disclosure, the predetermined decoding tool may be ACT and enabling information of the ACT may be restricted to have a value indicating disabling of ACT based on the color space being not an RGB color space.

In the image decoding method of the present disclosure, the predetermined decoding tool may be LMCS and enabling information of the LMCS may be obtained from the bitstream based on the color space being a color space having distinct luma and chroma channels.

In the image decoding method of the present disclosure, the predetermined decoding tool may be LMCS and enabling information of the LMCS may be restricted to have a value indicating disabling of LMCS based on the color space being an RGB color space.

An image decoding apparatus according to another aspect of the present disclosure may include a memory and at least one processor. The at least one processor may be configured to determine a color space of a current image, to determine whether to enable a predetermined decoding tool based on the color space and to decode the current image depending on whether to enable the predetermined decoding tool.

An image encoding method performed by an image encoding apparatus according to another aspect of the present disclosure may include determining a color space of a current image, determining whether to enable a predetermined encoding tool based on the color space, encoding the current image depending on whether to enable the predetermined encoding tool, and encoding, in a bitstream, color space information indicating the color space or enabling information indicating whether to enable the predetermined encoding tool.

In the image encoding method of the present disclosure, the predetermined encoding tool may be ACT and enabling information of the ACT may be encoded in the bitstream based on the color space being an RGB color space.

In the image encoding method of the present disclosure, the predetermined encoding tool may be ACT and enabling information of the ACT may be encoded to have a value indicating disabling of ACT based on the color space being not an RGB color space.

In the image encoding method of the present disclosure, the predetermined encoding tool may be LMCS and enabling information of the LMCS may be encoded in the bitstream based on the color space being a color space having distinct luma and chroma channels.

In the image encoding method of the present disclosure, the predetermined encoding tool may be LMCS and enabling information of the LMCS may be encoded to have a value indicating disabling of LMCS based on the color space being an RGB color space.

A transmission method according to another aspect of the present disclosure may transmit a bitstream generated by the image encoding apparatus or the image encoding method of the present disclosure.

A computer-readable recording medium according to another aspect of the present disclosure may store a bitstream generated by the image encoding method or the image encoding apparatus of the present disclosure.

The features briefly summarized above with respect to the present disclosure are merely exemplary aspects of the detailed description of the present disclosure that follows, and do not limit the scope of the present disclosure.

Advantageous Effects

According to the present disclosure, it is possible to provide an image encoding/decoding method and apparatus with improved encoding/decoding efficiency.

In addition, according to the present disclosure, it is possible to provide an image encoding/decoding method and apparatus capable of improving encoding/decoding efficiency, by efficiently signaling high level information for adaptive color transform (ACT) tool or luma mapping with chroma scaling (LMCS) tool control.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

The accompanying drawings below are provided to help understanding of the present disclosure, and may provide embodiments of the present disclosure with the detailed description. But, the technical features of the present disclosure are not limited to specific drawings, and features disclosed in each drawing may be combined with each other to constitute a new embodiment. Reference numerals in each drawing may refer to structural elements.

FIG. 10 is a view illustrating YCgCo-R reversible colour transform.

FIG. 11 is a view showing an example of a syntax structure for signaling information indicating whether to enable ACT.

FIG. 13 is a view illustrating an example of a syntax structure for signaling information indicating a colour representation method.

FIG. 14 is a view illustrating an example of an extended colour representation method when 3-bit sps_chroma_format_idc is used according to the example of FIG. 13.

FIG. 15 is a view illustrating another embodiment of a syntax structure for signaling information indicating a colour representation method.

DETAILED DESCRIPTION

Figure 1:
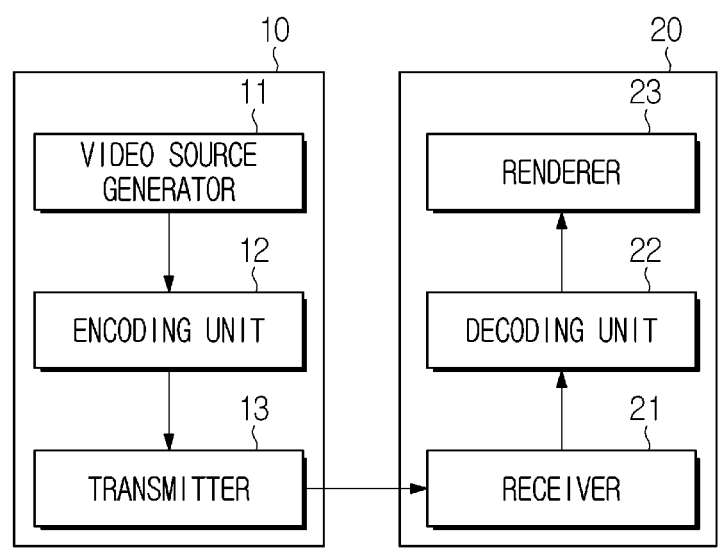
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The "luma block of the current block" may be expressed by including an explicit description of a luma component block, such as "luma block" or "current luma block". The "chroma block of the current block" may be expressed by including an explicit description of a chroma component block, such as "chroma block" or "current chroma block".

In the present disclosure, "A or B" may mean "only A", "only B" or "both A and B". In other words, in the present disclosure, "A or B" may be interpreted as "A and/or B". For example, in the present disclosure, "A, B or C" may mean "only A, "only B", "only C" or "any combination of A, B and C".

A slash (/) or comma used in the present disclosure may mean "and/or". For example, "A/B" may mean "A and/or B". Therefore, "A/B" may mean "only A", "only B" or "both A and B". For example, "A, B, C" may mean "A, B or C".

In the present disclosure, "at least one of A and B" may mean "only A", "only B" or "both A and B". In addition, in the disclosure, "at least one of A or B" or "at least one of A and/or B" may be interpreted as being the same as "at least one of A and B.

In addition, in the present disclosure, "at least one of A, B and C" may mean "only A", "only B", "only C" or "any combination of A, B and C". In addition, in the disclosure, "at least one of A, B or C" or "at least one of A, B and/or C" may be interpreted as being the same as "at least one of A, B and C".

In addition, parentheses used in the present disclosure may mean "for example". Specifically, when "prediction (intra prediction)" is described, "intra prediction" may be proposed as an example of "prediction". In other words, "prediction" of the present disclosure is not limited to "intra prediction" and "intra prediction" may be proposed as an example of "prediction". In addition, even when "prediction (that is, intra prediction)" is described, "intra prediction" may be proposed as an example of "prediction".

In the present disclosure, technical features individually described in one drawing may be implemented individually or simultaneously.

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
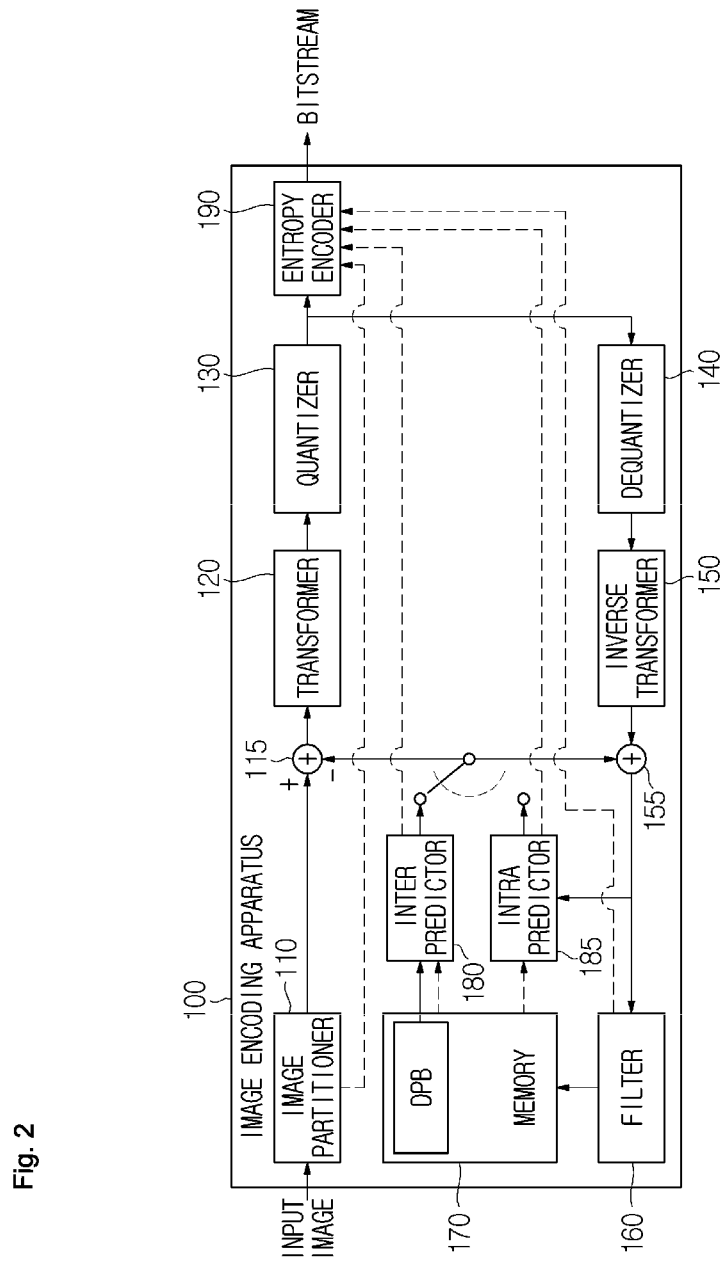
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The predictor (the inter predictor 180 or the intra predictor 185) may perform prediction on a block to be processed (current block) and generate a predicted block including prediction samples for the current block. The predictor may determine whether intra prediction or inter prediction is applied on a current block or CU basis. The predictor may generate various information related to prediction of the current block and transmit the generated information to the entropy encoder 190. The information on the prediction may be encoded in the entropy encoder 190 and output in the form of a bitstream.

The intra predictor 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 185 may determine the prediction mode applied to the current block by using a prediction mode applied to a neighboring block.

The inter predictor 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter predictor 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The predictor may generate a prediction signal based on various prediction methods and prediction techniques described below. For example, the predictor may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the predictor may perform intra block copy (IBC) for prediction of the current block. Intra block copy may be used for content video/image coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the predictor may be used to generate a reconstructed signal or to generate a residual signal. The subtractor 115 may generate a residual signal (residual block or residual sample array) by subtracting the prediction signal (predicted block or prediction sample array) output from the predictor from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter predictor 180 or the intra predictor 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied in the picture encoding and/or reconstruction.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter predictor 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter predictor 180. The memory 170 may store the motion information of the block from which the motion information in the current picture is derived (or encoded) and/or the motion information of the blocks in the picture that have already been reconstructed. The stored motion information may be transmitted to the inter predictor 180 and used as the motion information of the spatial neighboring block or the motion information of the temporal neighboring block. The memory 170 may store reconstructed samples of reconstructed blocks in the current picture and may transfer the reconstructed samples to the intra predictor 185.

Overview of Image Decoding Apparatus

Figure 3:
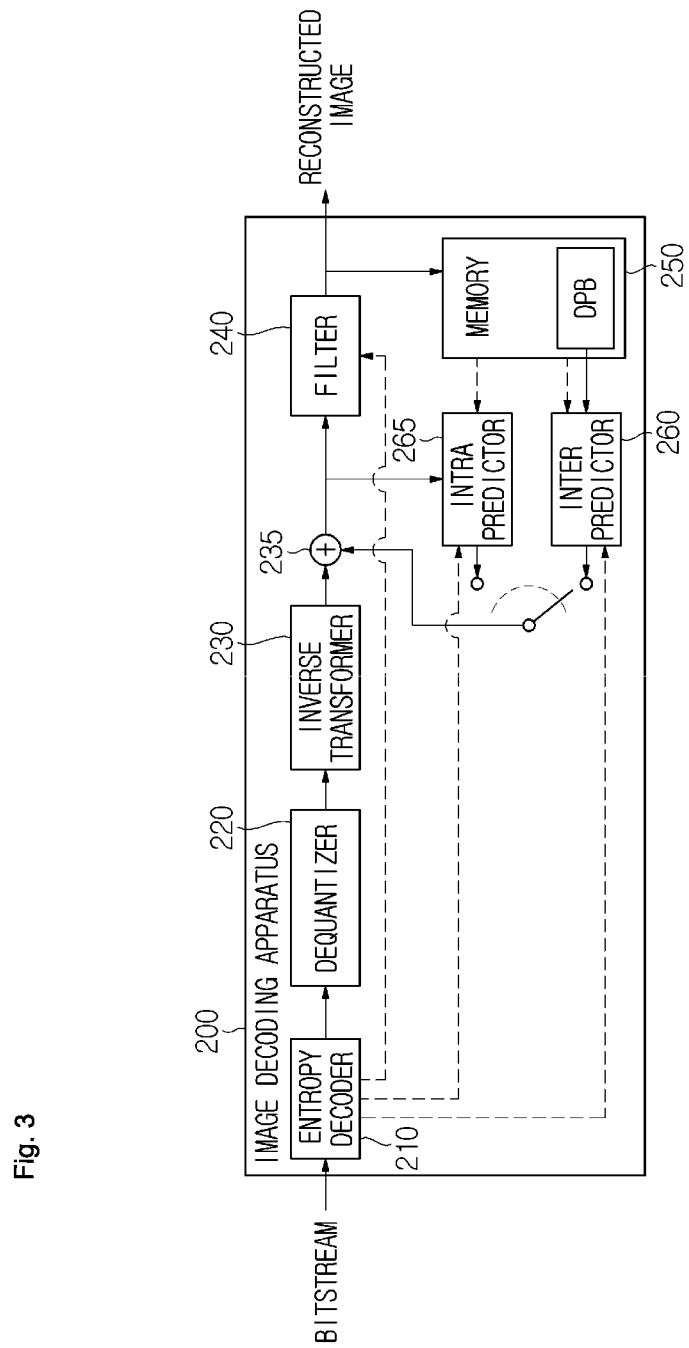
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively referred to as a "predictor". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the predictor (the inter predictor 260 and the intra predictor 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter predictor 160 or the intra predictor.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 210 and may determine a specific intra/inter prediction mode (prediction technique).

It is the same as described in the predictor of the image encoding apparatus 100 that the predictor may generate the prediction signal based on various prediction methods (techniques) which will be described later.

The intra predictor 265 may predict the current block by referring to the samples in the current picture. The description of the intra predictor 185 is equally applied to the intra predictor 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied in the picture decoding process.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra predictor 265.

In the present disclosure, the embodiments described in the filter 160, the inter predictor 180, and the intra predictor 185 of the image encoding apparatus 100 may be equally or correspondingly applied to the filter 240, the inter predictor 260, and the intra predictor 265 of the image decoding apparatus 200.

As described above, the quantizer of the encoding apparatus may derive quantized transform coefficients by applying quantization to transform coefficients, and the dequantizer of the encoding apparatus or the dequantizer of the decoding apparatus may derive transform coefficients by applying dequantization to the quantized transform coefficients. In encoding and decoding of a moving image/still image, a quantization rate may be changed and a compression rate may be adjusted using the changed quantization rate. From the viewpoint of implementation, in consideration of complexity, instead of directly using the quantization rate, a quantization parameter (QP) may be used. For example, quantization parameters having integer values from 0 to 63 may be used and each quantization parameter value may correspond to an actual quantization rate. In addition, a quantization parameter $QP_Y$ for a luma component (luma sample) and a quantization parameter $QP_C$ for a chroma component (chroma sample) may be differently set.

In the quantization process, a transform coefficient C may be received and divided by a quantization rate Qstep, thereby obtaining a quantized transform. In this case, the quantization rate may be multiplied by a scale in consideration of computational complexity to make an integer, and shift operation may be performed by a value corresponding to the scale value. A quantization scale may be derived based on a product of the quantization rate and the scale value. That is, the quantization scale may be derived according to QP. By applying the quantization scale to the transform coefficient C, a quantized transform coefficient C' may be derived.

The dequantization process is an inverse process of the quantization process. By multiplying the quantized transform coefficient C' by the quantization rate Qstep, thereby obtaining a reconstructed transform coefficient C". In addition, a level scale may be derived according to the quantization parameter, and the level scale may be applied to the quantized transform coefficient C', thereby deriving the reconstructed transform coefficient C". The reconstructed transform coefficient C" may be slightly different from an initial transform coefficient C due to loss of the transform and/or quantization process. Accordingly, the even in the encoding apparatus, dequantization may be performed in the same manner as in the decoding apparatus.

Meanwhile, adaptive frequency weighting quantization technology for adjusting a quantization strength according to the frequency may be applied. The adaptive frequency weighting quantization technology refers to a method of differently applying a quantization strength according to the frequency. In adaptive frequency weighting quantization, the quantization strength may be differently applied according to the frequency using a predefined quantization scaling matrix. That is, the above-described quantization/dequantization process may be performed based on the quantization scaling matrix.

For example, different quantization scaling matrices may be used according to the size of the current block and/or whether a prediction mode applied to the current block is inter prediction or intra prediction in order to generate the residual signal of the current block. The quantization scaling matrix may be referred to as a quantization matrix or a scaling matrix. The quantization scaling matrix may be predefined. In addition, for frequency adaptive scaling, frequency quantization scale information for the quantization scaling matrix may be constructed/encoded in the encoding apparatus and signaled to the decoding apparatus. The frequency quantization scale information may be referred to as quantization scaling information. The frequency quantization scale information may include scaling list data scaling_list_data.

The (modified) quantization scaling matrix may be derived based on the scaling list data. In addition, the frequency quantization scale information may include a present flag indicating whether the scaling list data is present. Alternatively, when the scaling list data is signaled at a higher level (e.g., SPS), information indicating whether the scaling list data is modified at a lower level (e.g., PPS or tile group header, etc.) may be further included.

General Video/Image Coding Procedure

In video/image coding, a picture configuring an video/image may be encoded/decoded according to a decoding order. A picture order corresponding to an output order of the decoded picture may be set differently from the decoding order, and, based on this, not only forward prediction but also backward prediction may be performed during inter prediction.

Figure 4:
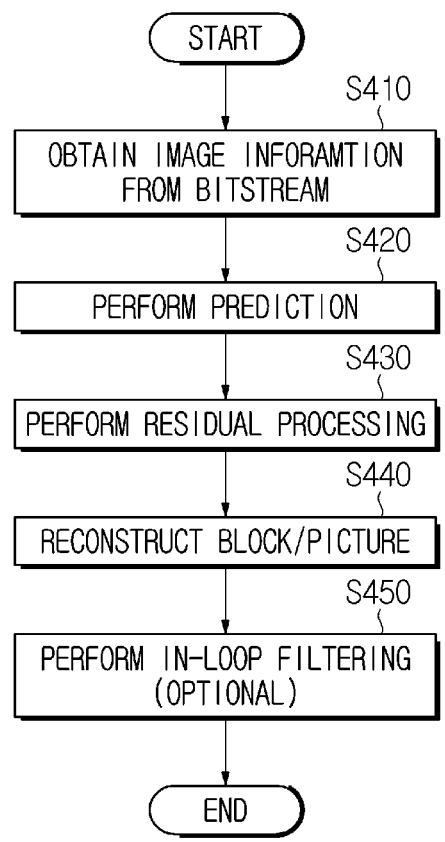
FIG. 4 is a view showing an example of a schematic picture decoding procedure, to which embodiment(s) of the present disclosure is applicable.

FIG. 4 shows an example of a schematic picture decoding procedure, to which embodiment(s) of the present disclosure is applicable.

Each procedure shown in FIG. 4 may be performed by the image decoding apparatus of FIG. 3. For example, step S410 may be performed by the entropy decoder 210, step S420 may be performed by a predictor including the predictors 265 and 260, step S430 may be performed by a residual processor 220 and 230, step S440 may be performed by the adder 235, and step S450 may be performed by the filter 240. Step S410 may include the information decoding procedure described in the present disclosure, step S420 may include the inter/intra prediction procedure described in the present disclosure, step S430 may include a residual processing procedure described in the present disclosure, step S440 may include the block/picture reconstruction procedure described in the present disclosure, and step S450 may include the in-loop filtering procedure described in the present disclosure.

Referring to FIG. 4, the picture decoding procedure may schematically include a procedure (S410) for obtaining video/image information (through decoding) from a bitstream, a picture reconstruction procedure (S420 to S440) and an in-loop filtering procedure (S450) for a reconstructed picture. The picture reconstruction procedure may be performed based on prediction samples and residual samples obtained through inter/intra prediction (S420) and residual processing (S430) (dequantization and inverse transform of the quantized transform coefficient) described in the present disclosure. A modified reconstructed picture may be generated through the in-loop filtering procedure for the reconstructed picture generated through the picture reconstruction procedure. In this case, the modified reconstructed picture may be output as a decoded picture, stored in a decoded picture buffer (DPB) of a memory 250 and used as a reference picture in the inter prediction procedure when decoding the picture later. The in-loop filtering procedure (S450) may be omitted. In this case, the reconstructed picture may be output as a decoded picture, stored in a DPB of a memory 250, and used as a reference picture in the inter prediction procedure when decoding the picture later. The in-loop filtering procedure (S450) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure is applied to the reconstructed picture, the SAO procedure may be performed. Alternatively, after the deblocking filtering procedure is applied to the reconstructed picture, the ALF procedure may be performed. This may be similarly performed even in the encoding apparatus.

Figure 5:
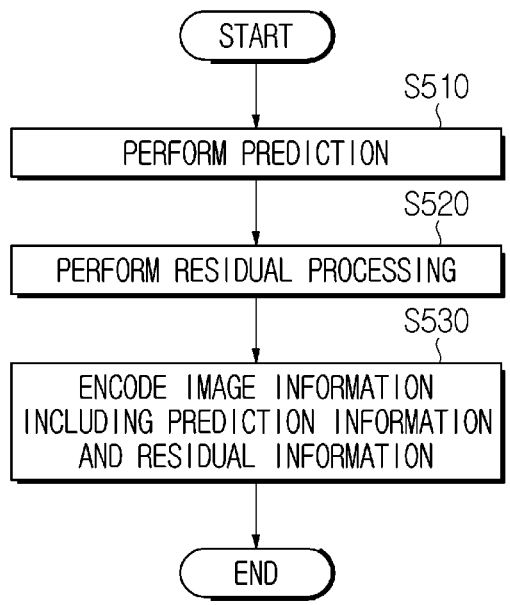
FIG. 5 is a view showing an example of a schematic picture encoding procedure, to which embodiment(s) of the present disclosure is applicable.

FIG. 5 shows an example of a schematic picture encoding procedure, to which embodiment(s) of the present disclosure is applicable.

Each procedure shown in FIG. 5 may be performed by the image encoding apparatus of FIG. 2. For example, step S510 may be performed by the predictors 185 and 180, step S520 may be performed by a residual processor 115, 120 and 130, and step S530 may be performed in the entropy encoder 190. Step S510 may include the inter/intra prediction procedure described in the present disclosure, step S520 may include the residual processing procedure described in the present disclosure, and step S530 may include the information encoding procedure described in the present disclosure.

Referring to FIG. 5, the picture encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture, as described with respect to FIG. 2. The encoding apparatus may derive (modified) residual samples from a quantized transform coefficient through the dequantizer 140 and the inverse transformer 150, and generate the reconstructed picture based on the prediction samples which are output of step S510 and the (modified) residual samples. The reconstructed picture generated in this way may be equal to the reconstructed picture generated in the decoding apparatus. The modified reconstructed picture may be generated through the in-loop filtering procedure for the reconstructed picture. In this case, the modified reconstructed picture may be stored in the decoded picture buffer or a memory 170, and may be used as a reference picture in the inter prediction procedure when encoding the picture later, similarly to the decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the decoding apparatus may perform the in-loop filtering procedure using the same method as the encoding apparatus based on the filtering related information.

Through such an in-loop filtering procedure, noise occurring during video/image coding, such as blocking artifact and ringing artifact, may be reduced and subjective/objective visual quality may be improved. In addition, by performing the in-loop filtering procedure in both the encoding apparatus and the decoding apparatus, the encoding apparatus and the decoding apparatus may derive the same prediction result, picture coding reliability may be increased and the amount of data to be transmitted for picture coding may be reduced.

As described above, the picture reconstruction procedure may be performed not only in the image decoding apparatus but also in the image encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. On the other hand, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to the remaining blocks. The color component of the picture may include a luma component and a chroma component and the methods and embodiments of the present disclosure are applicable to both the luma component and the chroma component unless explicitly limited in the present disclosure.

Example of Coding Layer Structure

Coded video/image according to the present disclosure may be, for example, processed according to the coding layer and structure described below.

Figure 6:
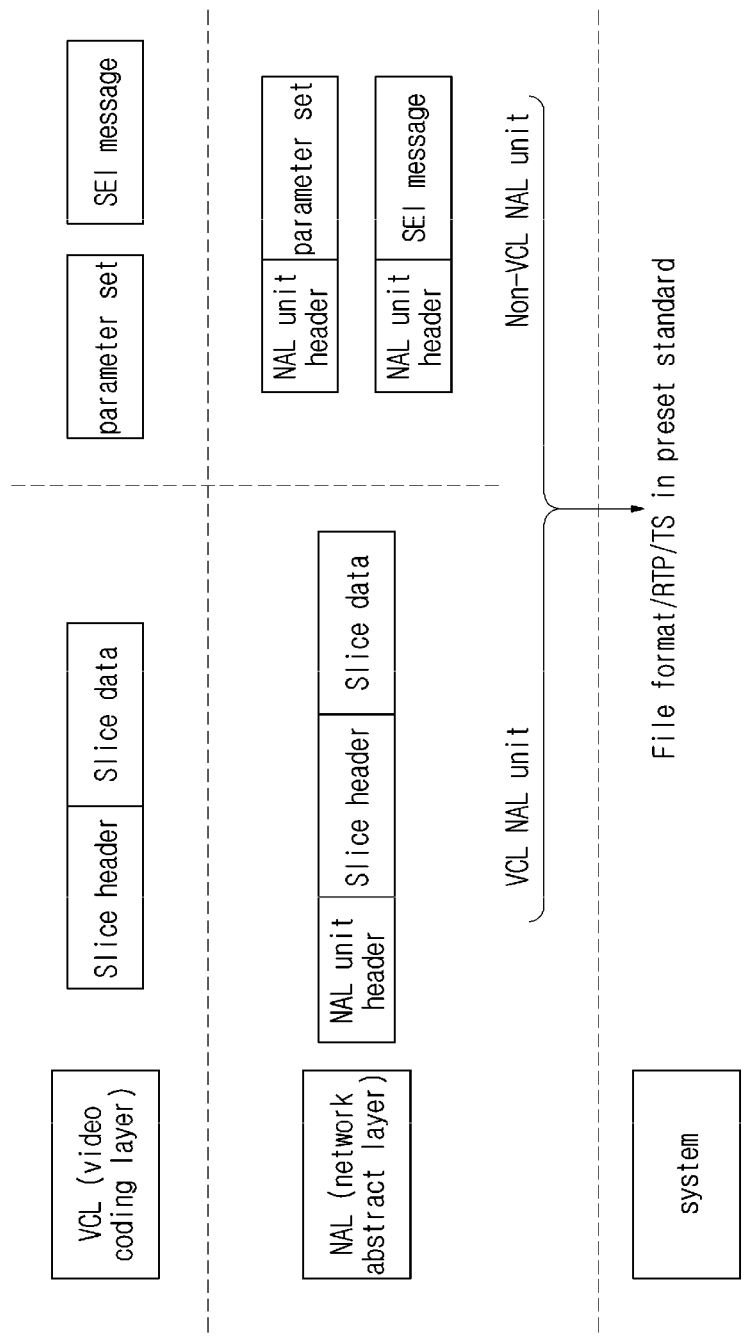
FIG. 6 is a view showing an example of a layer structure for a coded video/image.

FIG. 6 is a view showing a layer structure for a coded image.

The coded image is classified into a video coding layer (VCL) for an image decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate a NAL unit. In this case, the RBSP refers to slice data, a parameter set, an SEI message generated in the VCL. The NAL unit header may include NAL unit type information specified according to RBSP data included in a corresponding NAL unit.

As shown in FIG. 6, the NAL unit may be classified into a VCL NAL unit and a non-VCL NAL unit according to the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the lower system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled. For example, this may be largely classified into a VCL NAL unit type and a non-VCL NAL unit type depending on whether the NAL unit includes information on an image (slice data). The VCL NAL unit type may be classified according to the property and type of the picture included in the VCL NAL unit, and the Non-VCL NAL unit type may be classified according to the type of a parameter set.

An example of the NAL unit type specified according to the type of the parameter set/information included in the Non-VCL NAL unit type will be listed below.

DCI (Decoding capability information) NAL unit type (NUT):Type for NAL unit including DCI
   VPS(Video Parameter Set) NUT: Type for NAL unit including VPS
   SPS(Sequence Parameter Set) NUT: Type for NAL unit including SPS
   PPS(Picture Parameter Set) NUT: Type for NAL unit including PPS
   APS (Adaptation Parameter Set) NUT: Type for NAL unit including APS
   PH (Picture header) NUT: Type for NAL unit including PH The above-described NAL unit types may have syntax information for a NAL unit type, and the syntax information may be stored in a NAL unit header and signaled. For example, the syntax information may be nal_unit_type, and the NAL unit types may be specified using nal_unit_type values.

Meanwhile, as described above, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture. The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may information/parameters commonly applicable to multiple layers. The DCI (DCI syntax) may include information/parameters related to decoding capability.

In the present disclosure, a high level syntax (HLS) may include at least one of the APS syntax, the PPS syntax, the SPS syntax, the VPS syntax, the DCI syntax, the picture header syntax or the slice header syntax. In addition, in the present disclosure, a low level syntax (LLS) may include, for example, a slice data syntax, a CTU syntax, a coding unit syntax, a transform unit syntax, etc.

Meanwhile, in the present disclosure, video/image information encoded in the encoding apparatus and signaled to the decoding apparatus in the form of a bitstream may include not only in-picture partitioning related information, intra/inter prediction information, residual information, in-loop filtering information but also information on the slice header, information on the picture header, information on the APS, information on the PPS, information on the SPS, information on the VPS and/or information on the DCI. In addition, the video/image information may further include general constraint information and/or information on a NAL unit header.

Figures 7, 8, 9:
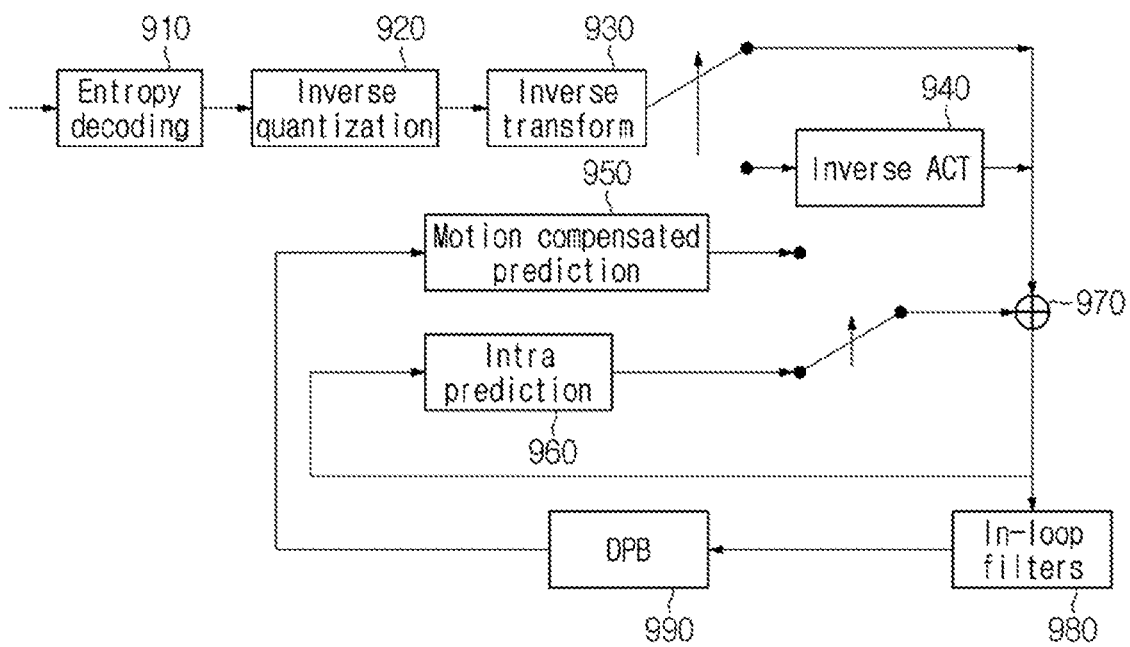
FIG. 7 is a view illustrating an example of a syntax structure for signaling information indicating whether to individually code a color element according to chroma sampling related to luma sampling.
FIG. 8 is a view illustrating values of variables SubWidthC and SubHeightC according to syntax related to a color element.
FIG. 9 is a view illustrating a decoding procedure using adaptive color transform (ACT).

FIG. 7 is a view illustrating an example of a syntax structure for signaling information indicating whether to individually code a color element according to chroma sampling related to luma sampling.

Referring to FIG. 7, Information indicating chroma sampling related to luma sampling(e.g., sps_chroma_format_idc) may be signaled. When sps_video_parameter_set_id is greater than 0 and the SPS is referenced by a layer that is included in the i-th multi-layer OLS specified by the VPS for any i in the range of 0 to NumMultiLayerOlss-1, inclusive, it is a requirement of bitstream conformance that the value of sps_chroma_format_idc shall be less than or equal to the value of vps_ols_dpb_chroma_format[i].

Information indicating whether the color components are separately coded(e.g., sps_separate_colour_plane_flag) may be signaled. sps_separate_colour_plane_flag equal to 1 may specify that the three colour components of the 4:4:4 chroma format are coded separately. sps_separate_colour_plane_flag equal to 0 may specify that the colour components are not coded separately. When sps_separate_colour_plane_flag is not present, it may be inferred to be equal to 0. When sps_separate_colour_plane_flag is equal to 1, the coded picture may consist of three separate components, each of which may consist of coded samples of one colour plane (Y, Cb, or Cr) and may use the monochrome coding syntax. In this case, each colour plane may be associated with a specific sh_colour_plane_id value. Depending on the value of sps_separate_colour_plane_flag, the value of the variable ChromaArrayType is assigned as follows:

If sps_separate_colour_plane_flag is equal to 0, ChromaArrayType may be set equal to sps_chroma_format_idc.
Otherwise (sps_separate_colour_plane_flag is equal to 1), ChromaArrayType may be set equal to 0.

FIG. 8 is a view illustrating values of variables SubWidthC and SubHeightC according to syntax related to a color element. In some of conventional video coding standards, the video source that is represented by the bitstream may correspond to a sequence of pictures in decoding order.

The source and decoded pictures may each consist of one or more sample arrays:

Luma (Y) only (monochrome).
Luma and two chroma (YCbCr or YCgCo).
Green, blue, and red (GBR, also known as RGB).
Arrays representing other unspecified monochrome or tri-stimulus colour samplings (for example, YZX, also known as XYZ).

For convenience of notation and terminology in this disclosure, the variables and terms associated with these arrays may be referred to as luma (or L or Y) and chroma, where the two chroma arrays may be referred to as Cb and Cr; regardless of the actual colour representation method in use. The actual colour representation method in use may be indicated in syntax that is specified in VUI parameters which specify video usability information.

The variables SubWidthC and SubHeightC may be specified in FIG. 8, depending on the chroma format sampling structure, which is specified through sps_chroma_format_idc and sps_separate_colour_plane_flag. Other values of sps_chroma_format_idc, SubWidthC and SubHeightC may be specified in the future.

A monochrome sampling may have only one sample array, which is nominally considered the luma array. In 4:2:0 sampling, each of the two chroma arrays may have half the height and half the width of the luma array. In 4:2:2 sampling, each of the two chroma arrays may have the same height and half the width of the luma array. In 4:4:4 sampling, depending on the value of sps_separate_colour_plane_flag, the following applies:

If sps_separate_colour_plane_flag is equal to 0, each of the two chroma arrays may have the same height and width as the luma array.
Otherwise (sps_separate_colour_plane_flag is equal to 1), the three colour planes may be separately processed as monochrome sampled pictures.

The number of bits necessary for the representation of each of the samples in the luma and chroma arrays in a video sequence may be in the range of 8 to 16, inclusive, and the number of bits used in the luma array may differ from the number of bits used in the chroma arrays.

FIG. 9 is a view illustrating a decoding procedure using adaptive color transform (ACT). ACT may correspond to a technique that existed in screen content coding to employ in-loop color space conversion in order to remove the inter-color-component redundancy. ACT may be adopted for 444 content(4:4:4 chroma format content).

ACT may be employed to adaptively convert prediction residuals from one color space to YCgCo space. ACT may be very beneficial when coding RGB content. Two color spaces may be adaptively selected by signaling one ACT flag for each TU(Transform Unit). When the flag is equal to one, it may indicate the residuals of the TU is coded in the YCgCo space; otherwise (i.e., the flag is equal to 0), it may indicate that the residuals of the TU is coded in the original color space.

Referring to FIG. 9, the motion compensated prediction may be referred to as the inter prediction in this disclosure. A reconstructed picture (or a reconstructed block, reconstructed sample array, reconstructed sample(s), reconstructed signal) may be generated based on the prediction output and the residual output (of inverse normal transform (such as inverse MTS based transform and/or inverse LFNST) or of inverse ACT). The prediction output may include a predicted block, a predicted sample array, predicted sample(s) or a predicted signal. The residual output may include a residual block, a residual sample array, residual sample(s), or a residual signal.

As an example, in encoding side, the ACT process may be performed on residual samples derived based on prediction samples, and the output of the ACT process may be an input of normal transform (such as MTS based transform and/or LFNST). Information (parameters) related to the (inverse) ACT may be generated/encoded by an encoding apparatus, and transmitted to a decoding apparatus through a bitstream.

Entropy decoding module 910 of the decoding apparatus may obtain/parse/decode the information (parameters) related to the (inverse) ACT and/or image data, and Inverse ACT module 940 may perform the inverse ACT based on the information (parameters) related to the (inverse) ACT. Based on the inverse ACT, (modified) residual samples (or residual block) may be derived. Specifically, (transform) coefficients may be derived by inverse quantization (performed by inverse quantization module 920) on quantized (transform) coefficients, and the residual samples may be derived by performing inverse transform (performed by inverse transform module 930), and inverse ACT module 940 may further perform inverse ACT to obtain (modified) residual samples. The motion compensated prediction or motion compensation may be referred to as the inter prediction, which may be performed by motion compensated prediction module 950. Or, the prediction samples may be derived by intra prediction performed by intra prediction module 960. The modified samples and the prediction samples may be added by adder 970 to generate reconstructed samples. The reconstructed samples may be filtered by in-loop filters 980 and the filtered reconstructed samples may be stored at DPB 990 as reference signals for future prediction.

FIG. 10 is a view illustrating YCgCo-R reversible colour transform. YCgCo-R transform may be applied as ACT to support both lossy and lossless cases.

Referring to FIG. 10, since the YCgCo-R transform are not normalized, to compensate the dynamic range change of residuals signals before and after color transform, the QP adjustments of (−5, 1, 3) may be applied to the transform residuals of Y, Cg and Co components, respectively. The adjusted quantization parameter may only affect the quantization and inverse quantization of the residuals in the CU. For other coding processes (such as deblocking filtering), original QP may still be applied.

Additionally, because the forward and inverse color transforms need to access the residuals of all three components, the ACT mode may always be disabled for separate-tree partition and ISP mode where the prediction block size of different color component is different. Transform skip (TS) and block differential pulse coded modulation (BDPCM), which are extended to code chroma residuals, may also be enabled when the ACT is applied.

FIG. 11 is a view showing an example of a syntax structure for signaling information indicating whether to enable ACT.

Referring to FIG. 11, information indicating whether ACT is activated and whether cu_act_enabled_flag exists(e.g., sps_act_enabled_flag) may be signaled. sps_act_enabled_flag equal to 1 may specify that adaptive colour transform is enabled and may be used in decoding of pictures in the CLVS and the cu_act_enabled_flag may be present in the coding unit syntax of the CLVS. sps_act_enabled_flag equal to 0 may specify that adaptive colour transform is disabled and not used in decoding of pictures in the CLVS and cu_act_enabled_flag is not present in the coding unit syntax of the CLVS. When sps_act_enabled_flag is not present, it may be inferred to be equal to 0.

Figure 12:
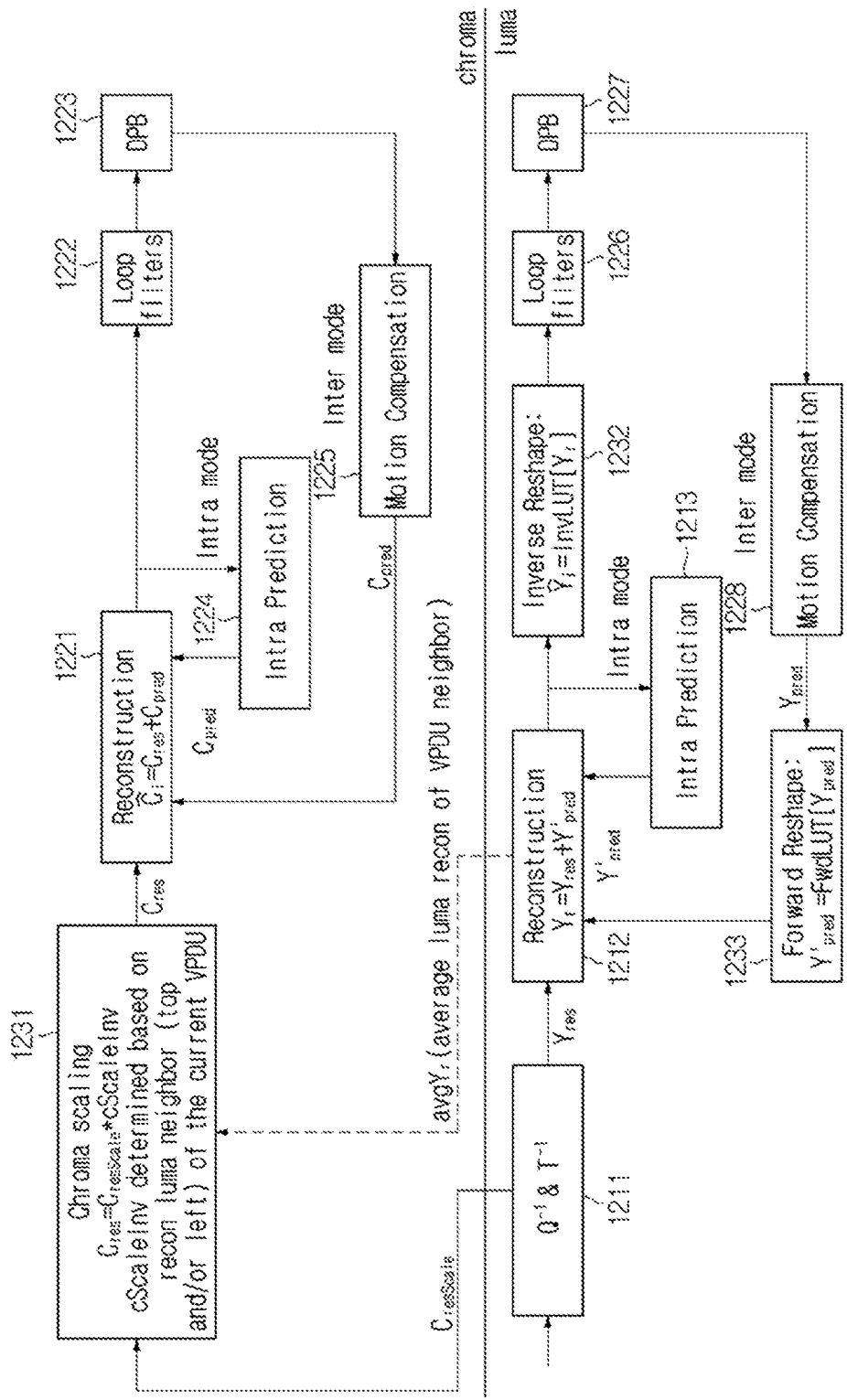
FIG. 12 is a view illustrating a luma mapping procedure using chroma scaling.

FIG. 12 is a view illustrating a luma mapping procedure using chroma scaling. A coding tool called the luma mapping with chroma scaling (LMCS) may be added before the loop filters. LMCS may have two main components: 1) in-loop mapping of the luma component based on adaptive piecewise linear models (lower part of FIG. 12); 2) for the chroma components, luma-dependent chroma residual scaling is applied (upper part of FIG. 12)

Referring to FIG. 12, modules 1211-1213 may indicate where the processing is applied in the mapped domain. these may include the inverse quantization and inverse transform (performed by module 1211), luma intra prediction (performed by module 1213) and adding of the luma prediction together with the luma residual (performed by module 1212). Modules 1221-1228 may indicate where the processing is applied in the original (i.e., non-mapped) domain; and these may include loop filters such as deblocking filtering, ALF, and SAO (performed by module 1226 and/or module 1222), motion compensated prediction (performed by module 1228 and/or module 1225), chroma intra prediction (performed by module 1224), adding of the chroma prediction together with the chroma residual (performed by module 1221), and storage of decoded pictures as reference pictures (performed by module 1223 and/or module 1227). Modules 1231-1233 may correspond to the LMCS functional blocks, including forward and inverse mapping of the luma signal (performed by module 1233 and module 1232, respectively) and a luma-dependent chroma scaling process (performed by module 1231). Like most other tools, LMCS may be enabled/disabled at the sequence level using an SPS flag.

Operation of LMCS will be described with reference to FIG. 12. In a chroma scaling module 1231, a chroma residual scaling factor may be derived based on luma reconstruction samples. In this case, an average luma value avgYr may be obtained based on external neighbor luma reconstruction samples of a reconstruction block instead of internal luma reconstruction samples of the reconstruction block, a chroma residual scaling factor cScaleInv may be derived based on the average luma value avgYr. Here, the neighbor luma reconstruction samples may be neighbor luma reconstruction samples of a current block or neighbor luma reconstruction samples of virtual pipeline data units (VPDUs) including the current block. For example, when intra prediction is applied to a target block, reconstruction samples may be derived based on prediction samples derived based on intra prediction. In addition, for example, when inter prediction is applied to the target block, in a forward reshape module 1233, forward mapping is applied to prediction samples $Y_{pred}$ derived based on inter prediction, and, based on reshaped (or forward mapped) luma prediction samples $Y'_{pred}$, in a reconstruction module 1212, reconstruction samples $Y_r$ may be generated. Video/image information signaled through a bitstream may include LMCS parameters (information on LMCS). LMCS parameters may be constructed through high level syntax (HLS).

Hereinafter, operation of LMCS according to the present disclosure will be described in greater detail.

The in-loop mapping of the luma component may adjust the dynamic range of the input signal by redistributing the codewords across the dynamic range to improve compression efficiency. Luma mapping may use a forward mapping function, FwdMap, and a corresponding inverse mapping function, InvMap. The FwdMap function may be signalled using a piecewise linear model with 16 equal pieces. FwdMap function may be a function used in the forward reshape module. InvMap function does not need to be signalled and may instead be derived from the FwdMap function. InvMap function may be a function used in inverse reshape module 1232.

The luma mapping model may be signalled in the adaptation parameter set (APS) syntax structure with aps_params_type set equal to 1 (LMCS_APS). Up to 4 LMCS APS's may be used in a coded video sequence. Only 1 LMCS APS may be used for a picture. The luma mapping model may be signalled using piecewise linear model. The piecewise linear model may partition the input signal's dynamic range into 16 equal pieces, and for each piece, its linear mapping parameters may be expressed using the number of codewords assigned to that piece. Take 10-bit input as an example. Each of the 16 pieces may have 64 codewords assigned to it by default. The signalled number of codewords may be used to calculate the scaling factor and adjust the mapping function accordingly for that piece. At the slice level, an LMCS enable flag may be signalled to indicate if the LMCS process as depicted in FIG. 12 is applied to the current slice. If LMCS is enabled for the current slice, an aps_id may be signalled in the slice header to identify the APS that carries the luma mapping parameters.

Each i-th piece, i=0 . . . 15, of the FwdMap piecewise linear model may be defined by two input pivot points InputPivot[ ] and two output (mapped) pivot points MappedPivot[ ].

The InputPivot[ ] and MappedPivot[ ] may be computed as follows (assuming 10-bit video):
1) OrgCW=64
2) For i=0:16, InputPivot[i]=i*OrgCW
3) For i=0:16, MappedPivot[i] is calculated as follows:
  MappedPivot[0]=0;
  for(i=0; i<16; i++)

MappedPivot[i+1]=MappedPivot[i]+SignalledCW[i]

where SignalledCW[i] is the signalled number of codewords for the i-th piece.

As shown in FIG. 12, for an inter-coded block, motion compensated prediction may be performed by motion compensation module 1228 in the mapped domain. In other words, after the motion-compensated prediction block $Y_{pred}$ is calculated based on the reference signals in the DPB 1227, the FwdMap function may be applied to map the luma prediction block in the original domain to the mapped domain, $Y'_{pred}$=FwdMap($Y_{pred}$). FwdMap may correspond to FwdLUT in forward reshape module 1233. For an intra-coded block, the FwdMap function may not be applied because intra prediction is performed in the mapped domain. After reconstructed block $Y_r$ is calculated, the InvMap function may be applied by inverse reshape module 1232 to convert the reconstructed luma values in the mapped domain back to the reconstructed luma values in the original domain ($\hat{Y}_i$=InvMap($Y_r$)). InvMap may correspond to InvLUT in inverse reshape module 1232. The InvMap function may be applied to both intra- and inter-coded luma blocks.

The luma mapping process (forward and/or inverse mapping) may be implemented using either look-up-tables (LUT) or using on-the-fly computation. If LUT is used, then FwdMapLUT(or FwdLUT) and InvMapLUT(or InvLUT) may be pre-calculated and pre-stored for use at the tile group level, and forward and inverse mapping may be simply implemented as FwdMap($Y_{pred}$)=FwdMapLUT[$Y_{pred}$] and InvMap($Y_r$)=InvMapLUT[$Y_r$], respectively. Alternatively, on-the-fly computation may be used. Take forward mapping function FwdMap as an example. In order to figure out the piece to which a luma sample belongs, the sample value may right be shifted by 6 bits (which corresponds to 16 equal pieces). Then, the linear model parameters for that piece may be retrieved and applied on-the-fly to compute the mapped luma value.

Let i be the piece index, a1, a2 be InputPivot[i] and InputPivot[i+1], respectively, and b1, b2 be MappedPivot[i] and MappedPivot[i+1], respectively. The FwdMap function may be evaluated as follows:

$$\text{FwdMap}(Y_{pred}) = ((b2-b1)/(a2-a1))*(Y_{pred}-a1)+1$$

The InvMap function may be computed on-the-fly in a similar manner Generally, the pieces in the mapped domain may not be equal sized, therefore the most straightforward inverse mapping process may require comparisons in order to figure out to which piece the current sample value belongs. Such comparisons may increase decoder complexity. For this reason, a bistream may have constraint on the values of the output pivot points MappedPivot[i] as follows. Assume the range of the mapped domain (for 10-bit video, this range is [0, 1023]) is divided into 32 equal pieces. If MappedPivot[i] is not a multiple of 32, then MappedPivot [i+1] and MappedPivot[i] may not belong to the same piece of the 32 equal-sized pieces, i.e. MappedPivot[i+1]>>(BitDepth$_Y$−5) shall not be equal to MappedPivot[i]>>(BitDepth$_Y$−5). Thanks to such bitstream constraint, the InvMap function may also be carried out using a simple right bit-shift by 5 bits (which corresponds 32 equal-sized pieces) in order to figure out the piece to which the sample value belongs.

Chroma residual scaling may be designed to compensate for the interaction between the luma signal and its corresponding chroma signals. Whether chroma residual scaling is enabled or not may also be signalled at the slice level. If luma mapping is enabled, an additional flag may be signalled to indicate whether luma-dependent chroma residual scaling is enabled or not. When luma mapping is not used, luma-dependent chroma residual scaling may be disabled. Further, luma-dependent chroma residual scaling may always be disabled for the chroma blocks whose area is less than or equal to 4.

Chroma residual scaling may vary according to the average value of top and/or left reconstructed neighbouring luma samples of the current VPDU. If the current CU is 128×128 inter predicted block, 128×64 inter predicted block or 64×128 inter predicted block, then the chroma residual scaling factor derived for the CU associated with the first VPDU may be used for all chroma transform blocks in that CU. Denote avgYr as the average of the reconstructed neighbouring luma samples in FIG. 12. The value of $C_{ScaleInv}$ may be computed by chroma scaling module 1231 in the following steps:
1) Find the index $Y_{Idx}$ of the piecewise linear model to which avgYr belongs based on the InvMap function.
2) $C_{ScaleInv}$=cScaleInv[$Y_{Idx}$], where cScaleInv[ ] is a 16-piece LUT pre-computed based on the value of SignalledCW[i] and a offset value signalled in APS for chroma residual scaling process.

Unlike luma mapping, which is performed on the sample basis, $C_{ScaleInv}$ is a constant value for the entire chroma block. With $C_{ScaleInv}$, chroma residual scaling may be applied by chroma scaling module 1231 as follows:
  Encoder side: $C_{ResScale}=C_{Res}*C_{Scale}=C_{Res}/C_{ScaleInv}$
  Decoder side: $C_{Res}=C_{ResScale}/C_{Scale}=C_{ResScale}*C_{ScaleInv}$ FIG. 13 is a view illustrating an example of a syntax structure for signaling information indicating a colour representation method. In the conventional video codec standard, there are only parameters to indicate chroma sampling, while there is no parameter to indicate colour representation, such as YUV, RGB or GBR. Accordingly, there is no way to automatically disable a tool based on the colour representation. This may cause confusions that some tools may be used together. It may also cause unnecessary parameter signaling if two flags or tools cannot exist together.

For example, ACT tool may be beneficial to RGB format. However, in the conventional video codec standard, signaling of sps_act_enabled_flag is dependent on ChromaArrayType, which indicates that chroma sampling is 4:4:4. That is, for both YUV 4:4:4 or RGB, ACT may be allowed. However, for YUV 4:4:4, ACT has no gain and thus enabling ACT will only cause encoder complexity increase and some loss. Accordingly, for YUV 4:4:4, it is beneficial to make it clear to not allow ACT.

LMCS tool may be designed for source which has distinct luma and chroma channels. For luma component, samples may be mapped based on piecewise linear models. For chroma component, luma-dependent chroma residual scaling may be applied. However, for sequences of format such as RGB/GBR etc., which do not have distinct luma and chroma components, applying mapping to one of the color components and applying residual scaling to the other two color components have adverse coding impact. Therefore, it would be desirable to make it clear that to not allow RGB format using LMCS tool. There may be other tools that are suitable for one type of source representation, while not suitable for other type of source type representation. Therefore it is useful to indicate the source representation in a bitstream. In the present disclosure, a color space may be used as the same meaning as a colour representation format or a colour representation method.

Referring to FIG. 13, a colour representation method may be explicitly signaled in the bitstream. In addition, signaled syntax may be signaled in an SPS. However, the name of the signaled syntax and a signaling position are not limited to the example of FIG. 13 and may be variously changed. For example, the colour representation method may be signaled using sps_chroma_format_idc signaled through the SPS. As described with reference to FIGS. 7 and 8, since the conventional sps_chroma_format_idc uses 2 bits, representable colour formats are limited to the example of FIG. 8. According to an embodiment of the present disclosure, as shown in FIG. 13, 3-bit sps_chroma_format_idc may be signaled. When 3-bit sps_chroma_format_idc is used, a colour representation method which may be indicated by sps_chroma_format_idc may be more diverse.

FIG. 14 is a view illustrating an example of an extended colour representation method when 3-bit sps_chroma_format_idc is used according to the example of FIG. 13.

Referring to FIG. 14, when sps_chroma_format_idc has a first value (e.g., 0), a chroma format may be Monochrome, the value of a variable SubWidthC may indicate 1, and the value of a variable SubHeightC may indicate 1. When sps_chroma_format_idc has a second value (e.g., 1), the chroma format may be 4:2:0 sampling, the value of the variable SubWidthC may indicate 2 and the value of the variable SubHeightC may indicate 2. When sps_chroma_format_idc has a third value (e.g., 2), the chroma format may be 4:2:2 sampling, the value of the variable SubWidthC may indicate 2, and the value of the variable SubHeightC may indicate 1. When sps_chroma_format_idc has a fourth value (e.g., 3), the chroma format may be YUV 4:4:4, the value of the variable SubWidthC may indicate 1, and the value of the variable SubHeightC may indicate 1. When sps_chroma_format_idc has a fifth value(e.g., 4), the chroma format may be RGB 4:4:4, the value of the variable SubWidthC may indicate 1, and the value of the variable SubHeightC may indicate 1. When sps_chroma_format_idc has a sixth value (e.g., 5), the chroma format may be Other 4:4:4, the value of the variable SubWidthC may indicate 1, and the value of the variable SubHeightC may indicate 1.

According to the embodiment described with reference to FIGS. 13 and 14, more various types of colour representation methods may be identified by signaling 3-bit sps_chroma_format_idc. In addition, selective enabling/disabling of a predetermined encoding/decoding tool (e.g., ACT tool, LMCS tool, etc.) may be more flexibly performed according to the identified color representation method. In the examples of FIGS. 13 and 14, 3-bit sps_chroma_format_idc is signaled, but the present disclosure is not limited thereto and sps_chroma_format_idc of 4 bits or more may be signaled to identify more various colour representation methods.

In the example of FIG. 13, information indicating whether to enable a predetermined encoding/decoding tool, such as information (e.g., sps_lmcs_enabled_flag) indicating whether LMCS is enabled for CLVS, information (e.g., sps_lfnst_enabled_flag) indicating whether lfnst_idx may be present in intra coding unit syntax, may be signaled.

FIG. 15 is a view illustrating another embodiment of a syntax structure for signaling information indicating a colour representation method.

Referring to FIG. 15, sps_chroma_format_idc may be signaled. sps_chroma_format_idc may be signaled using 2 bits. In addition, information (e.g., sps_colour_representation_idc) indicating colour representation may be additionally signaled. sps_colour_representation_idc may use 1 bit or more according to the number of colours to be represented. When sps_colour_representation_idc uses 1 bit and sps_colour_representation_idc has a first value (e.g., 0), this may indicate that colour representation is not RGB. When sps_colour_representation_idc has a second value (e.g., 1), this may indicate that colour representation is RGB. When sps_colour_representation_idc uses 2 bits and sps_colour_representation_idc has a first value (e.g., 0), colour representation may correspond to YUV. When sps_colour_representation_idc has a second value (e.g., 1), color representation may correspond to RGB/GBR. When sps_colour_representation_idc has a third value (e.g., 2), color representation may correspond to XYZ. When sps_colour_representation_idc has a fourth value (e.g., 3), colour representation may correspond to anything other than YUV, RGB/GBR, and XYZ.

Thereafter, information sps_lmcs_enabled_flag, sps_lfnst_enabled_flag, etc.) indicating whether to enable the predetermined encoding/decoding tool may be signaled as described with reference to FIG. 13.

According to the embodiment described with reference to FIG. 15, by signaling 1-bit or 2-bit sps_color_representation_idc, it is possible to identify more various types of colour representation methods. In addition, it is possible to more flexibly perform selective enabling/disabling of the predetermined encoding/decoding tool (e.g., ACT tool, LMCS tool, etc.) according to the identified colour representation method. In the example of FIG. 15, 1-bit or 2-bit sps_color_representation_idc is signaled, but the present disclosure is not limited thereto and sps_color_representation_idc of 3 bits or more may be signaled to identify more various colour representation methods.

Figures 16, 17, 18:
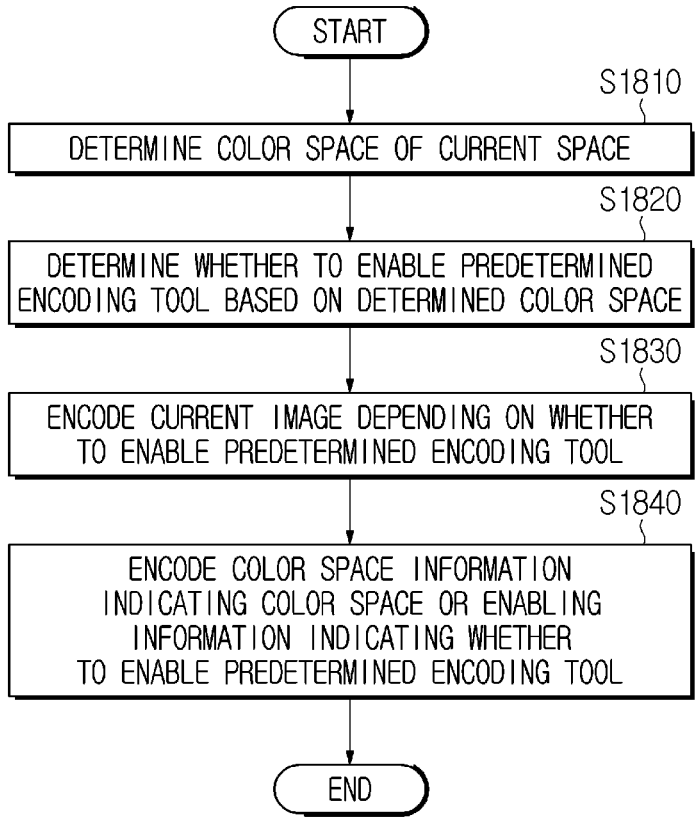
FIG. 16 is a view illustrating an example of a syntax structure for signaling information indicating whether to enable ACT according to information indicating a colour representation method.
FIG. 17 is a view illustrating an example of a syntax structure for signaling information indicating whether to enable LMCS according to information indicating a colour representation method.
FIG. 18 is a view illustrating operation of an image encoding apparatus according to an embodiment of the present disclosure.

FIG. 16 is a view illustrating an example of a syntax structure for signaling information indicating whether to enable ACT according to information indicating a colour representation method.

According to the embodiment of FIG. 16, control of ACT tool depending on colour representation format may be normatively done at sequence parameter level. More specifically, as the signaling condition of information (e.g., sps_act_enabled_flag) indicating whether to enable ACT tool, it may be determined whether the colour representation format is RGB. For example, only when sps_colour_representation_idc indicates RGB, sps_act_enabled_flag may be signaled. When sps_colour_representation_id does not indicate RGB, sps_act_enabled_flag is not signaled, and the value thereof may be inferred as a value indicating disabling of ACT.

According to the example of FIG. 16, a method of enabling ACT with respect to a specific colour representation format (e.g., RGB), by determining sps_colour_representation_idc as the signaling condition of sps_act_enabled_flag may be provided As another example of enabling control of ACT according to the colour representation format, when the colour representation format is not RGB, sps_act_enabled_flag may be restricted not to have a second value (e.g., 1) indicating enabling of ACT. That is, without changing the signaling condition of sps_act_enabled_flag, as the constraint of the bitstream, when the colour representation format is not RGB, sps_act_enabled_flag may be restricted to have only a specific value (first value (e.g., 0)).

The restriction is applicable as the constraint of encoder setting. In this case, the encoder may determine whether the color representation format is RGB or not (non-RGB). The encoder may not use ACT tool in the case of non-RGB. Accordingly, it is possible to prevent unnecessary RD search at the encoder and RD degradation caused by applying unsuitable tool. In addition, the encoder may encode sps_act_enabled_flag having a first value (e.g., 0) indicating disabling of ACT in the case of non-RGB.

According to the embodiment relating to enabling control of ACT according to the colour representation format, it is possible to more accurately and flexibly perform selective enabling/disabling of ACT according to the colour representation method of a current image.

FIG. 17 is a view illustrating an example of a syntax structure for signaling information indicating whether to enable LMCS according to information indicating a colour representation method.

According to the embodiment of FIG. 17, control of LMCS tool according to the colour representation format may be normatively performed at sequence parameter level. More specifically, as the signaling condition of information (e.g., sps_lmcs_enabled_flag) indicating whether to enable LMCS tool, whether the colour representation format is RGB may be determined. For example, only when sps_colour_representation_idc does not indicate RGB, sps_lmcs_enabled_flag may be signaled. When sps_colour_representation_idc indicates RGB, sps_lmcs_enabled_flag is not signaled and the value thereof may be inferred as a value indicating disabling of LMCS.

According to the example of FIG. 17, a method of enabling LMCS only when it is not a specific colour representation format (e.g., RGB), by determining sps_colour_representation_idc as the signaling condition of sps_lmcs_enabled_flag may be provided.

As another example of enabling control of LMCS according to the colour representation format, when the colour representation format is RGB, sps_lmcs_enabled_flag may be restricted not to have a second value (e.g., 1) indicating enabling of LMCS. That is, without changing the signaling condition of sps_lmcs_enabled_flag, as the restriction of the bitstream, when the colour representation format is RGB, sps_lmcs_enabled_flag may be restricted to have only a specific value (first value (e.g., 0)).

The restriction is applicable as the constraint of encoder setting. In this case, the encoder may determine whether the color representation format is RGB or not (non-RGB). The encoder may not use LMCS tool in the case of RGB. Accordingly, it is possible to prevent unnecessary RD search at the encoder and RD degradation caused by applying unsuitable tool. In addition, the encoder may encode sps_lmcs_enabled_flag having a first value (e.g., 0) indicating disabling of LMCS in the case of RGB.

According to the embodiment relating to enabling control of LMCS according to the colour representation format, it is possible to more accurately and flexibly perform selective enabling/disabling of LMCS according to the colour representation method of a current image.

According to another embodiment, the encoder may analyze the colour representation format of input sequence. In addition, when the input sequence is not an RGB sequence, ACT tool may be disabled. This may be done by setting the value of sps_act_enabled_flag to a first value (e.g., 0).

According to another embodiment, the encoder may analyze the colour representation format of input sequence. In addition, when the input sequence is an RGB sequence, LMCS tool may be disabled. This may be done by setting the value of sps_lmcs_enabled_flag to a first value (e.g., 0).

A decoder may determine whether the encoding/decoding tool is enabled or disabled based on the enabling information (e.g., sps_act_enabled_flag, sps_lmcs_enabled_flag etc.).

FIG. 18 is a view illustrating operation of an image encoding apparatus according to an embodiment of the present disclosure. A color space may correspond to a colour representation format or a colour representation method.

Referring to FIG. 18, the image encoding apparatus may determine the color space of a current image to be encoded (S1810). Color space information indicating the determined color space may be encoded in a bitstream as described below.

In addition, the image encoding apparatus may determine whether to enable a predetermined encoding tool based on the determined color space (S1820). The predetermined encoding tool may include ACT or LMCS. Enabling information indicating whether to enable the predetermined encoding tool may be encoded in the bitstream as described below.

When the predetermined encoding tool is ACT, ACT enabling information may be encoded in the bitstream based on the color space being an RGB color space. When the predetermined encoding tool is ACT, enabling information of ACT may be encoded to have a value indicating disabling of ACT based on the color space being not an RGB color space. When the predetermined encoding tool is LMCS, enabling information of LMCS may be encoded in the bitstream based on a color space (e.g., a YUV color space) having distinct luma and chroma channels. When the predetermined encoding tool is LMCS, enabling information of LMCS may be encoded to have a value indicating disabling of LMCS based on the color space being an RGB color space.

In addition, the image encoding apparatus may encode the current image depending on whether to enable the predetermined encoding tool (S1830). In addition, as described above, the image encoding apparatus may encode, in the bitstream, color space information indicating the color space or enabling information indicating whether to enable the predetermined encoding tool (S1840). Although step S1840 is shown as being performed after step S1830 in FIG. 18, the present disclosure is not limited thereto. For example, the color space information may be encoded after the color space is determined in step S1810 and the enabling information may be encoded after determining whether to perform enabling in step S1820.

Figure 19:
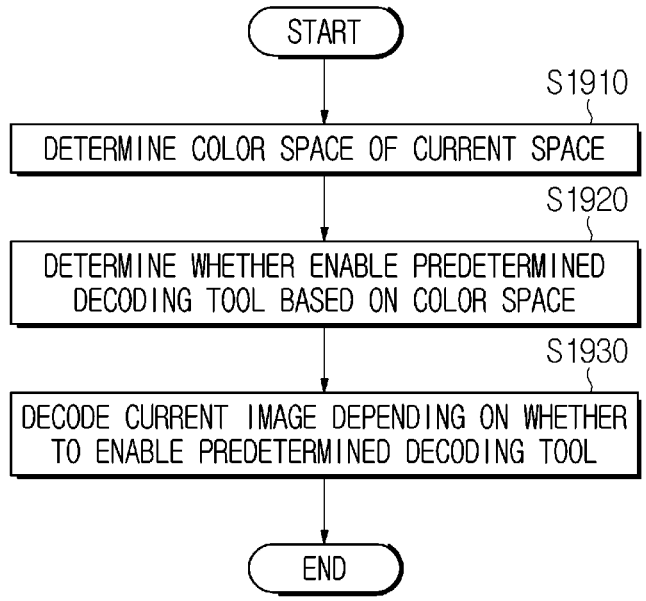
FIG. 19 is a view illustrating operation of an image decoding apparatus according to an embodiment of the present disclosure.

FIG. 19 is a view illustrating operation of an image decoding apparatus according to an embodiment of the present disclosure. A color space may correspond to a colour representation format or a colour representation method.

Referring to FIG. 19, the image decoding apparatus may determine the color space of a current image (S1910). This may be performed based on the color space information obtained from the bitstream, and the color space information may identify whether the color space of the current image is an RGB color space.

In addition, the image decoding apparatus may determine whether to enable a predetermined decoding tool based on the color space (S1920). The predetermined decoding tool may include ACT or LMCS. Whether to enable the predetermined decoding tool may be determined based on enabling information of the predetermined decoding tool obtained from the bitstream.

When the predetermined decoding tool is ACT, ACT enabling information may be obtained from the bitstream based on the color space being an RGB color space. When the predetermined decoding tool is ACT, enabling information of ACT may be encoded to have a value indicating disabling of ACT based on the color space being not an RGB color space. When the predetermined decoding tool is LMCS, enabling information of LMCS may be obtained from the bitstream based on a color space (e.g., a YUV color space) having distinct luma and chroma channels. When the predetermined decoding tool is LMCS, enabling information of LMCS may be encoded to have a value indicating disabling of LMCS based on the color space being an RGB color space.

In addition, the image decoding apparatus may decode the current image depending on whether to enable the predetermined decoding tool (S1930).

According to the embodiment described with reference to FIGS. 18 and 19, it is possible to more accurately and flexibly perform selective enabling/disabling of a predetermined encoding apparatus and/or a predetermined decoding apparatus according to an image encoding and/or decoding method of the present disclosure.

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 20:
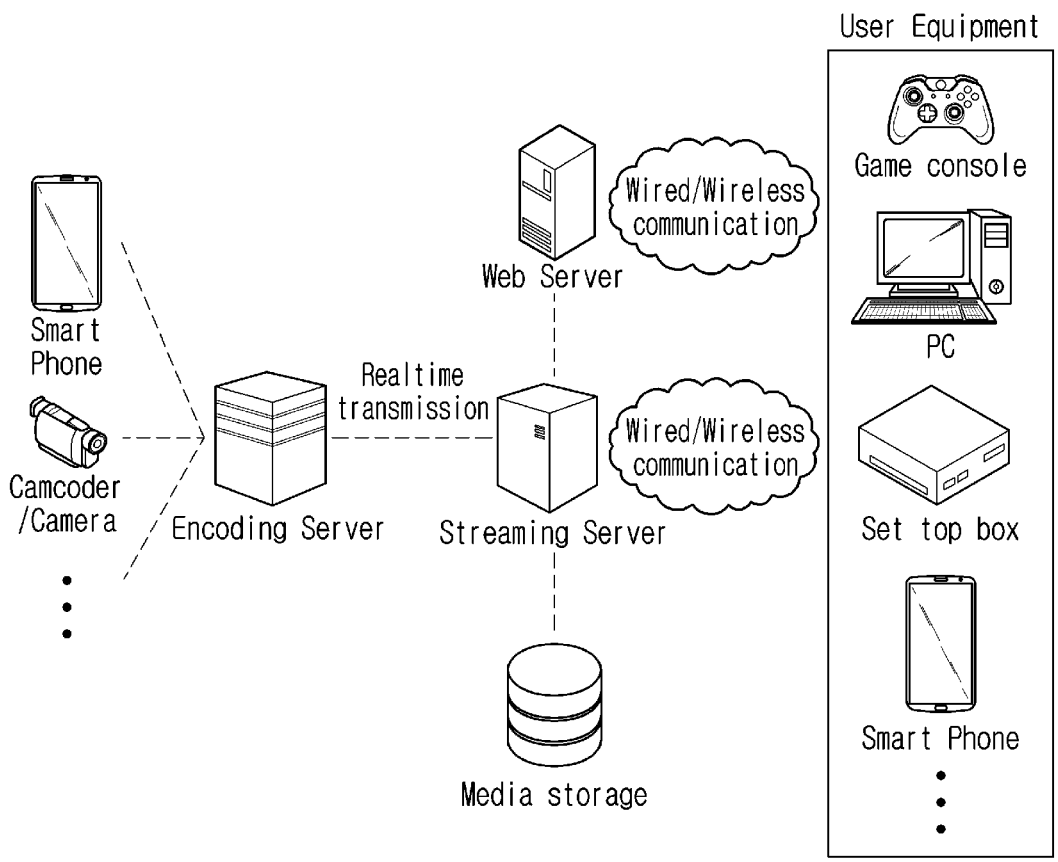
FIG. 20 is a view showing a content streaming system, to which an embodiment of the present disclosure is applicable.

FIG. 20 is a view showing a content streaming system, to which an embodiment of the present disclosure is applicable.

As shown in FIG. 20, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL AVAILABILITY

The embodiments of the present disclosure may be used to encode/decode an image.

The invention claimed is:

1. An image decoding method performed by an image decoding apparatus, the image decoding method comprising:
   determining a color space of a current image;
   determining whether to enable a predetermined decoding tool based on the color space; and
   decoding the current image depending on whether to enable the predetermined decoding tool,
   wherein the determining whether to enable the predetermined decoding tool is performed based on enabling information of the predetermined decoding tool obtained from a bitstream, and
   wherein the predetermined decoding tool comprises luma mapping with chroma scaling (LMCS) and the enabling information of the LMCS is restricted to have a value indicating disabling of the LMCS based on the color space being an RGB color space.

2. The image decoding method of claim 1, wherein the predetermined decoding tool comprises adaptive color transform (ACT) or the LMCS.

3. The image decoding method of claim 1,
   wherein the determining the color space of the current image is performed based on color space information obtained from the bitstream, and
   wherein the color space information identifies whether the color space of the current image is the RGB color space.

4. The image decoding method of claim 1, wherein the predetermined decoding tool comprises ACT and the enabling information of the ACT is obtained from the bitstream based on the color space being the RGB color space.

5. The image decoding method of claim 1, wherein the predetermined decoding tool comprises ACT and the enabling information of the ACT is restricted to have a value indicating disabling of ACT based on the color space not being the RGB color space.

6. The image decoding method of claim 1, wherein the predetermined decoding tool comprises LMCS and the enabling information of the LMCS is obtained from the bitstream based on the color space being a color space having distinct luma and chroma channels.

7. An image decoding apparatus, comprising:
   a memory; and
   at least one processor,
   wherein the at least one processor is configured to:
   determine a color space of a current image;
   determine whether to enable a predetermined decoding tool based on the color space; and
   decode the current image depending on whether to enable the predetermined decoding tool,
   wherein the determining whether to enable the predetermined decoding tool is performed based on enabling information of the predetermined decoding tool obtained from a bitstream, and
   wherein the predetermined decoding tool comprises luma mapping with chroma scaling (LMCS) and the enabling information of the LMCS is restricted to have a value indicating disabling of the LMCS based on the color space being an RGB color space.

8. An image encoding method performed by an image encoding apparatus, the image encoding method comprising:
   determining a color space of a current image;
   determining whether to enable a predetermined encoding tool based on the color space;
   encoding the current image depending on whether to enable the predetermined encoding tool; and
   encoding, in a bitstream, color space information indicating the color space or enabling information indicating whether to enable the predetermined encoding tool,
   wherein the determining whether to enable the predetermined encoding tool is performed based on the enabling information of the predetermined encoding tool, and
   wherein the predetermined encoding tool comprises luma mapping with chroma scaling (LMCS) and the enabling information of the LMCS is restricted to have a value indicating disabling of the LMCS based on the color space being an RGB color space.

9. The image encoding method of claim 8, wherein the predetermined encoding tool comprises adaptive color transform (ACT) and the enabling information of the ACT is encoded in the bitstream based on the color space being the RGB color space.

10. The image encoding method of claim 8, wherein the predetermined encoding tool comprises ACT and the enabling information of the ACT is encoded to have a value indicating disabling of ACT based on the color space not being the RGB color space.

11. The image encoding method of claim 8, wherein the predetermined encoding tool comprises LMCS and the enabling information of the LMCS is encoded in the bitstream based on the color space being a color space having distinct luma and chroma channels.

12. A non-transitory computer-readable recording medium storing a bitstream generated by the image encoding method of claim 8.

* * * * *